A. A. KELLY.
PACKING PULVERULENT, GRANULAR, AND OTHER SUBSTANCES.
APPLICATION FILED MAY 10, 1912.

1,077,835.

Patented Nov. 4, 1913.

Witnesses
M. E. McDade

Inventor
Albert A. Kelly
by

UNITED STATES PATENT OFFICE.

ALBERT ANDREW KELLY, OF SIDCUP, ENGLAND.

PACKING PULVERULENT, GRANULAR, AND OTHER SUBSTANCES.

1,077,835. Specification of Letters Patent. Patented Nov. 4, 1913.

Application filed May 10, 1912. Serial No. 696,481.

*To all whom it may concern:*

Be it known that I, ALBERT ANDREW KELLY, a subject of the King of Great Britain, residing at Wilpha, Longlands Park Road, Sidcup, in the county of Kent, England, have invented certain new and useful Improvements in Packing Pulverulent, Granular, and other Substances, of which the following is a specification.
This invention is for improvements in packing pulverulent, granular and other substances and has for its object a method for the production of a simple, efficient and cheap form of protective envelop for substances such as photographic chemicals, effervescent granules, surgical dressings and the like, which it is desired to keep out of contact with the atmosphere until required for use.
According to this invention a container is arranged with outer walls formed of material impregnated with a non-oleaginous insoluble substance capable of being rendered adhesive on the application of heat thereto, said container being provided with or without internal dividing walls of similar material. Sheets of tissue paper impregnated with such a substance are already known in the art of photography, in which they are employed in what is known as the "dry mounting" process, and no broad claim is made to such sheets *per se*.

Figure 1:
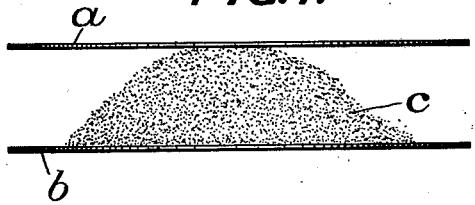
Figure 2:
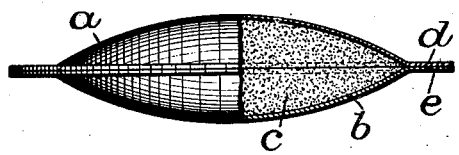
Figure 3:
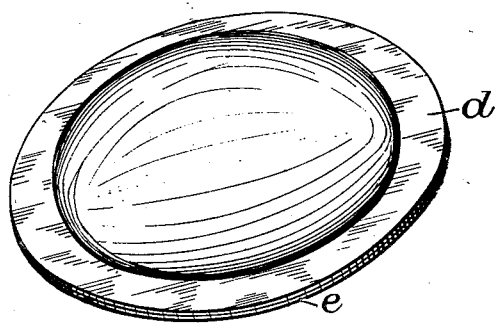
Figure 4:
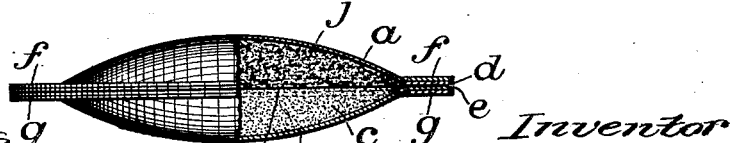

Referring to the drawings which show one form of the invention. Figure 1 is an elevation of pulverulent substance placed between two impregnated sheets preparatory to pressing. Fig. 2 is an elevation part in section after the container has been pressed into shape. Fig. 3 is a perspective plan view of the same. Fig. 4 is an elevation part in section of a modification of a container provided with a dividing wall.

The same reference letters are used for corresponding parts throughout the drawings. *a* and *b* are sheets of impregnated material such as tissue paper and *c* is a chemical or other pulverulent substance; *d* and *e* are flanges formed on the impregnated material in the process of pressing.
In Fig. 4 *g* and *f* are annular rings of paper, calico or like substance provided in a modified form of the invention, and *h* is a dividing wall formed of impregnated material and employed in a further modification to prevent the two different materials *c* and *j* being in contact with one another.

In carrying out the method of preparing a container two pieces of impregnated material are cut to the desired shape and the chemical or other material placed between, as shown in Fig. 1. The impregnated material and chemicals are then pressed in a suitably shaped and heated iron or press so that flanges are formed on the impregnated material which adhere to one another owing to the heat and pressure applied, the chemical remaining hermetically sealed within a central cavity formed between the walls of the impregnated material, as shown in Fig. 2.

If desired sheets of plain paper, calico or other suitable substance may be placed between the impregnated material and the iron or press, such calico or like substance adhering to the impregnated material when heat and pressure are applied thereto, and so partially covering the container or envelop as shown at *g* and *f*, Fig. 4.

Two (or more) materials may be inclosed in a container, as shown at *c* and *j*, Fig. 4, such materials being separated from one another by dividing the container or envelop into two (or more) compartments by means of dividing walls or septa consisting of a layer (or layers) of the impregnated material, as shown at *h* Fig. 4. This divided form of envelop or container constitutes the preferred method of packing photographic chemicals such as developers, in which case the reducing agent such as pyrogallol either alone or with bromid or sulfite, or with bromid and sulfite and the like are placed between two layers of said prepared tissue paper, and the alkali is placed between one of said layers and a third layer; all said chemicals being in pulverulent form and the edges of all said layers of prepared tissue paper being sealed by the application thereto of heat and pressure as aforesaid.

If desired the insoluble impregnated tissue paper may be pressed so as to form depressions to receive the pulverulent or other material, to be inclosed thereby.

While the above described method is of especial service in the packing of photographic chemicals and other substances of a similar nature which require to be protected from atmospheric influences, the invention is not limited in its application to such substances, for tea, cocoa, coffee, tobacco, cigarettes and the like may equally well be packed according to the method.

For articles such as cigarettes and tobacco larger containers are necessary, and these are preferably formed by folding a piece of the impregnated tissue together with one or more layers of paper, calico or the like, around a suitably shaped former and sealing the overlapping edges by the application of heat and pressure thereto. The container thus made is then drawn off the former and after the contents have been inserted the ends are closed by the application thereto of further pieces of tissue which are hot-pressed thereon as described.

In order to withdraw and use the contents of such containers the material of which they are composed is simply torn or cut to allow said contents to escape.

Gum lac, shellac, or the like non-oleoginous insoluble adhesive may be employed for impregnating the sheets.

What I claim is:—

1. A package for photographic and other substances consisting of two dish-shaped flanged sections, each formed of a single layer of air and moisture proof material, the flanges adhering together and thereby uniting said sections.

2. A package for photographic and other substances consisting of two dish-shaped flanged sections formed of single layers of tissue paper impregnated with gum lac, said flanges being caused to adhere together by the application of heat and pressure.

3. A package consisting of two dish-shaped flanged sections formed of single layers of air and moisture proof material; flanges on said dish-shaped sections and annular rings of stiffening material disposed upon the outside of said flanges.

4. A package consisting of two dish-shaped flanged sections formed of single layers of air and moisture proof material, said sections being united by said flanges, and means for dividing the interior of said package to form separate compartments.

5. A package consisting of two dish-shaped flanged sections formed of single layers of air and moisture proof material, said sections being united by said flanges, and dividing walls in the interior of said package composed of air and moisture proof material.

In testimony whereof I have hereunto set my hand in presence of two subscribing witnesses.

ALBERT ANDREW KELLY.

Witnesses:
ERNEST JOHN HILL,
HARRY JOHN STOGDEN.